US012182269B2

(12) United States Patent
Babic et al.

(10) Patent No.: US 12,182,269 B2
(45) Date of Patent: Dec. 31, 2024

(54) AUTOMATIC GENERATION OF PATCHES FOR SECURITY VIOLATIONS

(71) Applicant: Google LLC, Mountain View, CA (US)

(72) Inventors: Domagoj Babic, Mountain View, CA (US); Omer Tripp, San Jose, CA (US); Franjo Ivancic, Princeton, NJ (US); Sam Kerner, Fairfax, VA (US); Markus Kusano, Herndon, VA (US); Timothy King, Mountain View, CA (US); Stefan Bucur, Mountain View, CA (US); Wei Wang, San Jose, CA (US); László Szekeres, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 988 days.

(21) Appl. No.: 16/980,546

(22) PCT Filed: Jul. 17, 2018

(86) PCT No.: PCT/US2018/042448
§ 371 (c)(1),
(2) Date: Sep. 14, 2020

(87) PCT Pub. No.: WO2019/226188
PCT Pub. Date: Nov. 28, 2019

(65) Prior Publication Data
US 2021/0004470 A1 Jan. 7, 2021

Related U.S. Application Data

(60) Provisional application No. 62/674,133, filed on May 21, 2018.

(51) Int. Cl.
*G06F 21/57* (2013.01)
*G06F 8/658* (2018.01)
*G06F 11/36* (2006.01)

(52) U.S. Cl.
CPC ............ *G06F 21/577* (2013.01); *G06F 8/658* (2018.02); *G06F 11/3688* (2013.01); *G06F 2221/033* (2013.01)

(58) Field of Classification Search
CPC ............ G06F 21/577; G06F 2221/033; G06F 21/563; H04L 63/1433
See application file for complete search history.

(56) References Cited

U.S. PATENT DOCUMENTS 7,845,006 B2 * 11/2010 Akulavenkatavara ...................... G06F 11/3644
710/266
8,037,529 B1 10/2011 Chiueh et al.
(Continued)

FOREIGN PATENT DOCUMENTS

CN 101154257 A 4/2008
CN 105787367 A 7/2016

OTHER PUBLICATIONS

R. Russell et al., "Automated Vulnerability Detection in Source Code Using Deep Representation Learning," 2018 17th IEEE International Conference on Machine Learning and Applications (ICMLA), Orlando, FL, USA, 2018, pp. 757-762. (Year: 2018).*
(Continued)

*Primary Examiner* — Kari L Schmidt
(74) *Attorney, Agent, or Firm* — Lerner David LLP

(57) ABSTRACT

Aspects of the disclosure provide for automatically generating patches for security violations. For example, a plurality of inputs may be generated for code. The code may be executed using the plurality of inputs to obtain execution states at a plurality of code locations. The execution states may include at least one security violation for at least some of the plurality of inputs. Using the execution states, one or more patch conditions causing the at least one security violation may be determined. Using the execution states, one
(Continued)

or more corresponding patch locations may be determined based on a code location of the plurality of code locations where the at least one security violation each of the one or more patch conditions occurred. At least one candidate patch for the at least one security violation may be automatically generated. The at least one candidate patch may include one of the patch conditions and one of the corresponding patch locations.

17 Claims, 15 Drawing Sheets

(56) References Cited

U.S. PATENT DOCUMENTS

| | | | | |
|---|---|---|---|---|
| 8,108,931 | B1* | 1/2012 | Witten | G06F 21/14 |
| | | | | 726/25 |
| 8,296,756 | B1* | 10/2012 | Feeser | G06F 8/658 |
| | | | | 717/173 |
| 8,499,353 | B2* | 7/2013 | Lockhart | G06F 11/3612 |
| | | | | 726/25 |
| 9,063,818 | B1* | 6/2015 | Risbood | G06N 20/00 |
| 9,792,443 | B1* | 10/2017 | Sheridan | G06F 21/563 |
| 9,971,671 | B2* | 5/2018 | Inamdar | G06F 11/3648 |
| 10,282,550 | B1* | 5/2019 | Sheridan | G06F 8/65 |
| 10,587,641 | B2* | 3/2020 | Madou | H04L 63/1433 |
| 10,628,764 | B1* | 4/2020 | Kaplan | G06Q 10/063112 |
| 11,036,868 | B2* | 6/2021 | Sheridan | G06F 21/57 |
| 11,874,929 | B2* | 1/2024 | Ramasamy | G06F 21/577 |
| 2005/0044418 | A1* | 2/2005 | Miliefsky | H04L 63/0272 |
| | | | | 726/4 |
| 2006/0021035 | A1* | 1/2006 | Conti | G06F 21/554 |
| | | | | 726/22 |
| 2006/0026283 | A1* | 2/2006 | Trueba | G06F 21/577 |
| | | | | 709/225 |
| 2006/0101450 | A1* | 5/2006 | Datta | G06F 8/65 |
| | | | | 717/168 |
| 2006/0101457 | A1* | 5/2006 | Zweifel | G06F 8/65 |
| | | | | 717/174 |
| 2006/0136867 | A1* | 6/2006 | Schneider | G06F 21/14 |
| | | | | 717/136 |
| 2009/0144827 | A1 | 6/2009 | Peinado et al. | |
| 2012/0260344 | A1* | 10/2012 | Maor | A61K 38/1709 |
| | | | | 726/25 |
| 2012/0317647 | A1 | 12/2012 | Brumley et al. | |
| 2014/0096255 | A1* | 4/2014 | Beskrovny | G06F 21/577 |
| | | | | 726/25 |
| 2017/0155514 | A1* | 6/2017 | Schulz | G06F 21/57 |
| 2017/0187743 | A1* | 6/2017 | Madou | G06F 21/566 |
| 2018/0129579 | A1* | 5/2018 | Debnath | G06F 11/3065 |
| 2018/0276372 | A1* | 9/2018 | Crabtree | G06F 9/455 |
| 2018/0336356 | A1* | 11/2018 | Papaxenopoulos | G06F 8/65 |
| 2019/0102564 | A1* | 4/2019 | Li | G06N 3/04 |
| 2019/0166149 | A1* | 5/2019 | Gerrick | G06F 21/577 |
| 2019/0238593 | A1* | 8/2019 | Larmuseau | G06F 8/65 |
| 2022/0148001 | A1* | 5/2022 | Rafferty | G06N 3/08 |
| 2023/0123835 | A1* | 4/2023 | Kumar | G06F 21/577 |
| | | | | 726/25 |
| 2024/0152604 | A1* | 5/2024 | Kim | G06N 5/025 |

OTHER PUBLICATIONS

Qi, Zichao, et al. "An analysis of patch plausibility and correctness for generate-and-validate patch generation systems." Proceedings of the 2015 International Symposium on Software Testing and Analysis. 2015, pp. 24-36. (Year: 2015).*
Chernis, Boris, and Rakesh Verma. "Machine learning methods for software vulnerability detection." Proceedings of the fourth ACM international workshop on security and privacy analytics. 2018, pp. 31-39. (Year: 2018).*
Jonas Wagner, et al., "High System-Code Security with Low Overhead", IEEE (2015) 14 pgs.
Zhen Huang et al.: "Senx: Sound Patch Generation for Security Vulnerabilities." Nov. 29, 2017 (Nov. 29, 2017), XP055520240, Retrieved from the Internet: URL: https:jarxiv.orgjpdfj1711.11136v1. pdf <URL:https:jjarxiv.orgjpdfj1711.11136v1.pdf> [retrieved on Oct. 30, 2018]. 15 pages.
Anonymous: "Automatic bug fixing—Wikipedia", May 2, 2017 (May 2, 2017), XP055520305, Retrieved from the Internet: URL: https://web.archive.orgjweb/20170502163757/https:/jen.wikipedia. orgjwiki/Automatic bug fixing [retrieved on Oct. 31, 2018].
International Search Report and Written Opinion for PCT Application No. PCT/US2018/042448, dated Nov. 12, 2018. 16 pages.
First Examination Reort for Indian Patent Application No. 202047049833 dated Dec. 9, 2021. 7 pages.
International Preliminary Report on Patentability for International Application No. PCT/US2018/042448 dated Dec. 3, 2020. 9 pages.
Examination Report from EP Application No. 18755966.1, dated Jun. 21, 2022. 7 pages.
Perkins et al., "Automatically Patching Errors in Deployed Software," Proceedings of the ACM SIGOPS 22nd Symposium on Operating Systems Principles, SOSP '09, Oct. 11, 2009, pp. 87-102, ACM Press, New York, New York, USA, XP058334133. 16 pages.
Office Action for Chinese Patent Application No. 201880091955.9 dated Nov. 14, 2023. 14 pages.

* cited by examiner

```
size_t length = 10;
char *buff = malloc(length);
size_t idx = GetInteger();
buff[idx] = 'a';
```

FIGURE 3A

```
size_t length = 10;
char *buff = malloc(length);
size_t idx = GetInteger();
assert(0<=idx);
assert(idx<length)
buff[idx] = 'a';
```

FIGURE 3B

```
struct MyString {
  char* content;
  size_t length;
};
struct MyString Create(char* content) {
  assert(content != nullptr);
  struct MyString result;
  result->length = strlen(content);
  result->content = strdup(content);
  assert(result->content != nullptr);
  return result;
}
void TrimTrailingCharacter(struct MyString* str) {
  assert(str != nullptr);
  assert(str->content != nullptr);
  str->length--; // NOTE: This may underflow.
  str->content[str->length] = '\0'; // BOOM!
}
void DoSomethingUseful(char* user_input) {
  struct MyString str = Create(user_input);
  TrimTrailingCharacter(str);
   ...
}
```

FIGURE 4A

```
void TrimTrailingCharacter(struct MyString* str) {
  assert(str != nullptr);
  assert(str->content != nullptr);
  LOG_IF(FATAL, str->length == 0) << "Patch option 1";
  str->length--; // NOTE: This may underflow.
  LOG_IF(FATAL, strlen(str->content) < str->length) << "Patch option 2";
  str->content[str->length] = '\0'; // BOOM!
}
```

FIGURE 4B

```
void BuggyUser() {
  const char *str = {'a', 'b', 'c'};
  char *duplicated = malloc(sizeof(str));
  DuplicateLastCharacter(str, sizeof(str), dest);
}
void NonBuggyUser() {
  const char *str = {'a', 'b', 'c'};
  char *duplicated = malloc(sizeof(str) + 1);
  DuplicateLastCharacter(str, sizeof(str), dest);
}
void
DuplicateLastValue(char *source, int size, char *dest) {
  // Copy `size` bytes from source to dest.
  memcpy(dest, source, size);
  *(dest + size) = *(dest + size);
}
```

FIGURE 5

```
void BuggyStrCpy() {
  char dest[5];
  char *src;
  if (...) {
      src = "abc"; // Size 4 array.
  } else {
      src = "abcde"; // Size 6 array.
  }
  strcpy(dest, src);
}
```

FIGURE 6

```
void BufferFunction(char *buffer,
int size) {
    bool c = …;
    if (c) {
       buffer[size - 1] = 'x';
    }
    char end = buffer[size - 1];
}
```

FIGURE 7

```
::util::StatusOr<int> RoundedAngle(float angle) {
  if (angle < 0.0) {
    return ::util::FailedPreconditionError("angle should not be negative");
  }
  const int rounded_angle = (int) angle; // Float-to-int cast.
  return rounded_angle;
}
```

FIGURE 8A

```
::util::StatusOr<int> RoundedAngle(float angle) {
  if (angle < 0.0) {
    return ::util::FailedPreconditionError("angle should not be negative");
  }
  LOG_IF(FATAL, angle > std::numeric_limits<int>::max())
    << "Auto generated patch to avoid undefined behavior due to overflow";
  const int rounded_angle = (int) angle; // Float-to-int cast.
  return rounded_angle;
}
```

FIGURE 8B

```
int x = rand100(); // The first input to our program.
int y = rand100(); // The second input to our program.
// Goal: Add sanity checks on x and y here.
int x2 = x+2; // Some computation based on the first input.
int y2 = 10*y; // Some computation based on the second input.
if (x2 > y2) {
CRASH(); // Something bad happened.
```

FIGURE 10

AUTOMATIC GENERATION OF PATCHES FOR SECURITY VIOLATIONS

CROSS-REFERENCE TO RELATED APPLICATIONS

The present application is a national phase entry under 35 U.S.C. § 371 of International Application No. PCT/US2018/042448, filed Jul. 17, 2018, which claims the benefit of the filing date of U.S. Provisional Application No. 62/674,133, filed May 21, 2018, the entire disclosure of which is hereby incorporated herein by reference.

BACKGROUND

Security bugs or violations in software or application code may take significant amounts of time, for instance many months or more, and resources to fix. Efforts to find security violations yield a steady stream of such issues, so that at any given time many security violations are open or unfixed. In practice, the process of creating, testing, and deploying a fix requires an unschedulable effort by a number of human operators. Fixing these issues quickly is not feasible as long as operators are in the critical path. During the time these security violations are open, these applications remain at risk. As an example, security violations may include memory safety violations (such as reading data beyond a size of the buffer used for that data as this could improperly allow access to data that the application should otherwise not be accessing in order to function), input validation errors, race conditions, undefined behaviors, and so on.

BRIEF SUMMARY

Aspects of the disclosure provide method of automatically generating patches for security violations. The method includes generating, by one or more processors, a plurality of inputs for code; executing, by the one or more processors, the code using the plurality of inputs to obtain execution states at a plurality of code locations, the execution states including at least one security violation for at least one of the plurality of inputs; determining, by the one or more processors using the execution states, one or more patch conditions causing the security violation; determining, by the one or more processors, using the execution states, one or more corresponding patch locations based on a code location of the plurality of code locations where the at least one security violation conditions occurred; and automatically generating, by the one or more processors, at least one candidate patch for the at least one security violation, the at least one candidate patch includes one of the patch conditions and one of the one or more corresponding patch locations.

In one example, the method also includes generating, by the one or more processors, patched code by inserting the at least one candidate patch into the code. In another example, the at least one candidate patch is configured to cause the at least some of the plurality of inputs associated with the at least one security violation to fail execution. In this example, the at least one candidate patch causes at least part of the code to abort execution before a security violation can occur. In another example, the at least one candidate patch is configured to generate a log of diagnostic information for a security violation. In another example, the method also includes generating, by the one or more processors, a set of candidate patched codes by inserting each of the one or more candidate patches into the code; executing, by the one or more processors, each of the candidate patched codes using the plurality of inputs to obtain patched execution states at the plurality of code locations; selecting, by the one or more processors, a candidate patch among the one or more candidate patches based on the patched execution states; and generating, by the one or more processors, second patched code by inserting the selected candidate patch into the code. In another example, the method also includes selecting, by the one or more processors, a candidate patch from the at least one candidate patches based on at least one of complexity, proximity to a site of the at least one security violation, or impact on execution of the code and generating, by the one or more processors, patched code by inserting the selected candidate patch into the code. In this example, the method also includes generating, by the one or more processors, a new plurality of inputs for the patched code; executing, by the one or more processors, the patched code using the new plurality of inputs to obtain new execution states at the plurality of code locations, the new execution states including a new security violation; computing, by the one or more processors using the new execution states, one or more new patch conditions causing the new security violation associated with one or more of the plurality of inputs; determining, by the one or more processors, using the new execution states, one or more new corresponding patch locations where each of the one or more new patch conditions occur; and generating, by the one or more processors, at least one new candidate patch for the new security violation, each of the at least one new candidate patch includes one of the new patch conditions and one of the new corresponding patch locations, wherein the at least one new candidate patch is configured to cause the new violating inputs associated with the new security violation to fail execution. In addition or alternatively, training inputs for a learning-based model are clustered based on whether the input results in a security violation. In another example, the one or more patch conditions are generated using a machine learning model, and the method further comprises inputs for the model are clustered based on whether the input reaches a region of interest in the code. In another example, determining the one or more patch conditions further comprises determining at least one dynamic invariant related to the at least one security violation. In this example, the dynamic invariant includes a predicate template. In addition or alternatively, the method also includes joining two or more of the dynamic invariants in order to determine the one or more patch conditions. In another example, generating the one or more patch conditions further comprises determining a weakest precondition related to the at least one security violation. In another example, generating the one or more patch conditions further comprises tracking data flow through memory states collected by logs. In this example, tracking data flow through memory states includes using selective memory tracking.

Another aspect of the disclosure provides a system for automatically generating patches for security violations. The system includes one or more processors configured to generate a plurality of inputs for code; execute the code using the plurality of inputs to obtain execution states at a plurality of code locations, the execution states including a security violation for at least one of the plurality of inputs; determine, using the execution states, one or more patch conditions causing the security violation; determine, using the execution states, one or more corresponding patch locations based on a code location of the plurality of code locations where the at least one security violation each of the one or more patch conditions occurred; and automatically generate at least one candidate patch for the at least one security violation, the at least one candidate patch includes one of the patch conditions and one of the one or more corresponding patch locations.

In one example, the one or more processors are further configured to generate patched code by inserting the at least one candidate patch into the code. In another example, the at least one candidate patch is configured to cause the at least some of the plurality of inputs associated with the at least security violation to fail execution and at least part of the code to abort execution before a security violation can occur. In another example, the at least one candidate patch is configured to generate a log of diagnostic information for a security violation.

Such features are advantageous because they may be used to protect vulnerable code from attack via security violations even before a full fix is available. These feature provide for automatic generation of patches for security violations without having to wait for a full fix by operators. These patches, while not fixing the program's logic entirely, may cause the code to abort before a security violation occurs, thereby hardening or protecting the code from exploitation. This has the advantage to bring the time to mitigate potential exploitation down from months to hours. Further, the patches may have alternative or additional functions such as collecting data for better forensic analyses and displaying security violations to warn developers and users.

BRIEF DESCRIPTION OF THE DRAWINGS

FIGS. 3A-3B are examples of code and patched code in accordance with aspects of the disclosure.

FIGS. 4A-4B are examples of code and patched code in accordance with aspects of the disclosure.

FIG. 5 is an example of code in accordance with aspects of the disclosure.

FIG. 6 is an example of code in accordance with aspects of the disclosure.

FIG. 7 is an example of code in accordance with aspects of the disclosure.

FIGS. 8A-8B are examples of code and patched code in accordance with aspects of the disclosure.

FIG. 10 is an example of code in accordance with aspects of the disclosure.

DETAILED DESCRIPTION

Overview

Figure 1:
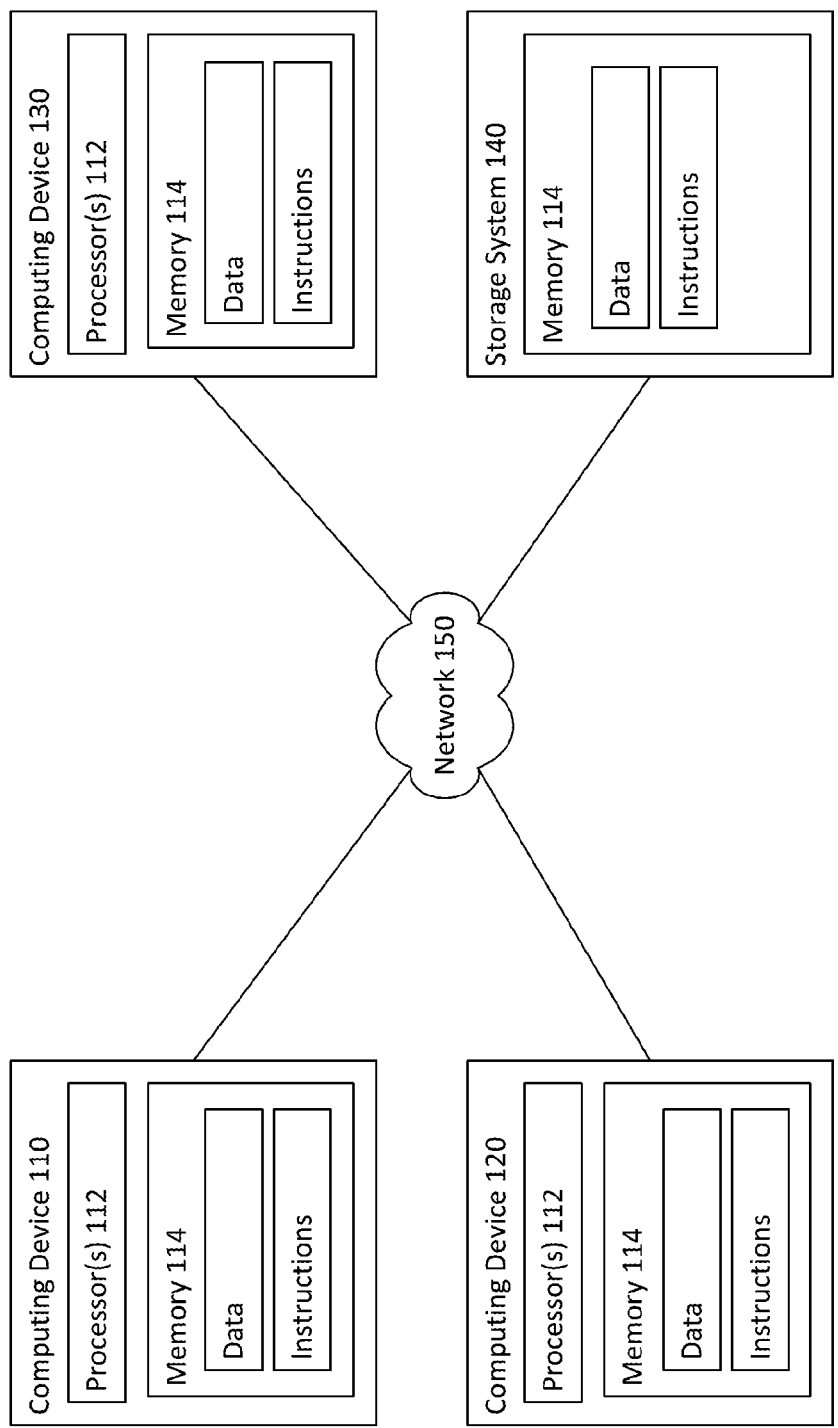
FIG. 1 is a block diagram illustrating an example system according to aspects of the disclosure.

The technology generally relates to automatically generating patches for security vulnerabilities in computer code. Security violations may regularly be detected during development and after deployment of the code. While some system may implement automation for finding security violations at a large scale, these systems lack the ability to automatically mitigate the impact of known security violations. A lack of automation to fix the found issues may cause security violations to languish as operators manually address them. Moreover, the process of creating, testing, and deploying a full fix, which likely involves team effort, may take a significant amount of time. The process may therefore leave the code vulnerable to attack, potentially for days or even months.

In this regard, an automated solution that addresses this gap by providing patches for security violations or vulnerabilities may be especially useful. These patches, while not fixing an application's logic entirely, may be used to cause an application to abort before a security vulnerability occurs, thereby hardening the application from exploitation, in some cases indefinitely, but ideally until a full and complete fix is deployed. This has the potential to bring the time to mitigate potential exploitation down from months to hours or even less.

In order to protect vulnerable code from attack, a patch for the security violation may be automatically generated. For instance, inputs may be generated for the code using fuzzing techniques. The code may then be executed using each of the generated inputs. For each execution, states at various code locations may be monitored including whether or not security violations have occurred. The code, the generated inputs, and the execution states may be analyzed to determine conditions that likely caused the security violation associated with one or more of the inputs as well as to determine corresponding patch locations where the conditions are likely to occur. Based on these evaluations, at least one candidate patch may be generated for a security violation. The candidate patch may include a patch condition and one of the corresponding patch locations. The at least one candidate patch may cause the violating inputs associated with the security violation to fail execution and/or log the execution in order to allow operators to observe the issue in real-time and further investigate using the log.

The technology described herein is advantageous because it protects vulnerable code from attack via security violations even before a full fix is available. The technology provides automatic generation of patches for security violations without having to wait for a full fix by operators. These patches, while not fixing the program's logic entirely, may cause the code to abort before a security violation occurs, thereby hardening or protecting the code from exploitation. This has the advantage to bring the time to mitigate potential exploitation down from months to hours. In addition, heuristics and machine learning may be used to select automatically generated patches that block security violations, but still allow passing execution with non-violating inputs. The technology further provides iterative processes to validate the generated patch, analyze the impact of the patch, and produce more suitable patches for selection. Further, the patches may have alternative or additional functions such as collecting data for better forensic analyses and displaying security violations to warn developers and users.

Aspects of the disclosure provide for automatically generating patches for security violations. For example, a plurality of inputs may be generated for computer code. The code may be executed using the plurality of inputs to obtain execution states at a plurality of code locations. The execution states may include at least one security violation for at least one of the plurality of inputs. Using the execution states, one or more patch conditions causing the at least one security violation may be determined. Using the execution states, one or more corresponding patch locations may be determined based on a code location of the plurality of code locations where the at least one security violation each of the one or more patch conditions occurred. At least one candidate patch for the security violation may be automatically generated. The at least one candidate patch may include one of the patch conditions and one of the corresponding patch locations.

EXAMPLES

FIG. 1 includes an example system 100 in which the features described herein may be implemented. It should not be considered as limiting the scope of the disclosure or usefulness of the features described herein. In this example, system 100 can include computing devices 110, 120, 130 and storage system 140 connected via a network 150. Each computing device 110, 120, 130 can contain one or more processors 112, memory 114 and other components typically present in general purpose computing devices.

Although only a few computing devices and a storage systems are depicted in the system 100, the system may be expanded to any number of additional devices. In addition to a system including a plurality of computing devices and storage systems connected via a network, the features described herein may be equally applicable to other types of devices such as individual chips, including those incorporating System on Chip (Soc) or other chips with memory.

Memory 114 of each of computing devices 110, 120, 130 can store information accessible by the one or more processors 112, including instructions that can be executed by the one or more processors. The memory can also include data that can be retrieved, manipulated or stored by the processor. The memory can be of any non-transitory type capable of storing information accessible by the processor, such as a hard-drive, memory card, ROM, RAM, DVD, CD-ROM, write-capable, and read-only memories.

The instructions can be any set of instructions to be executed directly, such as machine code, or indirectly, such as scripts, by the one or more processors. In that regard, the terms "instructions," "application," "steps," and "programs" can be used interchangeably herein. The instructions can be stored in object code format for direct processing by a processor, such as the one or more processors 112, or in any other computing device language including scripts or collections of independent source code modules that are interpreted on demand or compiled in advance. Functions, methods, and routines of the instructions are explained in more detail below.

Data may be retrieved, stored or modified by the one or more processors 112 in accordance with the instructions. For instance, although the subject matter described herein is not limited by any particular data structure, the data can be stored in computer registers, in a relational database as a table having many different fields and records, or XML documents. The data can also be formatted in any computing device-readable format such as, but not limited to, binary values, ASCII or Unicode. Moreover, the data can comprise any information sufficient to identify the relevant information, such as numbers, descriptive text, proprietary codes, pointers, references to data stored in other memories such as at other network locations, or information that is used by a function to calculate the relevant data.

The one or more processors 112 can be any conventional processors, such as a commercially available CPU. Alternatively, the processors can be dedicated components such as an application specific integrated circuit ("ASIC") or other hardware-based processor. Although not necessary, one or more of computing devices 110 may include specialized hardware components to perform specific computing processes, such as decoding video, matching video frames with images, distorting videos, encoding distorted videos, etc. faster or more efficiently.

Although FIG. 1 functionally illustrates the processor, memory, and other elements of computing device 110 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 110. Accordingly, references to a processor, computer, computing device, or memory will be understood to include references to a collection of processors, computers, computing devices, or memories that may or may not operate in parallel. For example, the computing devices 110 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over network 150.

Each of the computing devices 110, 120, 130 can be at different nodes of a network 150 and capable of directly and indirectly communicating with other nodes of network 150. Although only a few computing devices are depicted in FIG. 1, it should be appreciated that a typical system can include a large number of connected computing devices, with each different computing device being at a different node of the network 150. For instance, each of computing devices 110, 120, 130 may be server computing devices that are part of a load-balanced server farm.

The network 150 and intervening nodes described herein can be interconnected using various protocols and systems, such that the network can be part of the Internet, World Wide Web, specific intranets, wide area networks, or local networks. The network can utilize standard communications protocols, such as Ethernet, WiFi and HTTP, protocols that are proprietary to one or more companies, and various combinations of the foregoing. Although certain advantages are obtained when information is transmitted or received as noted above, other aspects of the subject matter described herein are not limited to any particular manner of transmission of information.

Like the memory discussed above, the storage system 140 may also store information that can be accessed by any of the computing devices 110, 120, and/or 130. However, in this case, the storage system 140 may store information that can be accessed over the network 150. As with the memory, the storage system can include any non-transitory type capable of storing information accessible by the processor, such as a hard-drive, memory card, ROM, RAM, DVD, CD-ROM, write-capable, and read-only memories.

In this example, the aforementioned instructions of each of computing devices 110, 120, 130 may include one or more applications. These applications may include code that can be run in order to perform various tasks. At least some of this code may be vulnerable to attacks from third parties looking to steal information, slow down processing speeds, or otherwise cause havoc. In addition, the applications may include a "patch generator" 280 (shown in FIG. 2 as "program metadata" 270) configured to automatically generates patches based on any of a variety types of data (shown in FIG. 2 as "program metadata" 270), a "code-miner" (shown in FIG. 2 as "code-miner" 240) with generates at least some of the program metadata, a "candidate selector" (shown in FIG. 11 as candidate selector 1110) which selects or determines a winning patch from the candidate patches, as well as various other instructions as discussed further below.

Figure 2:
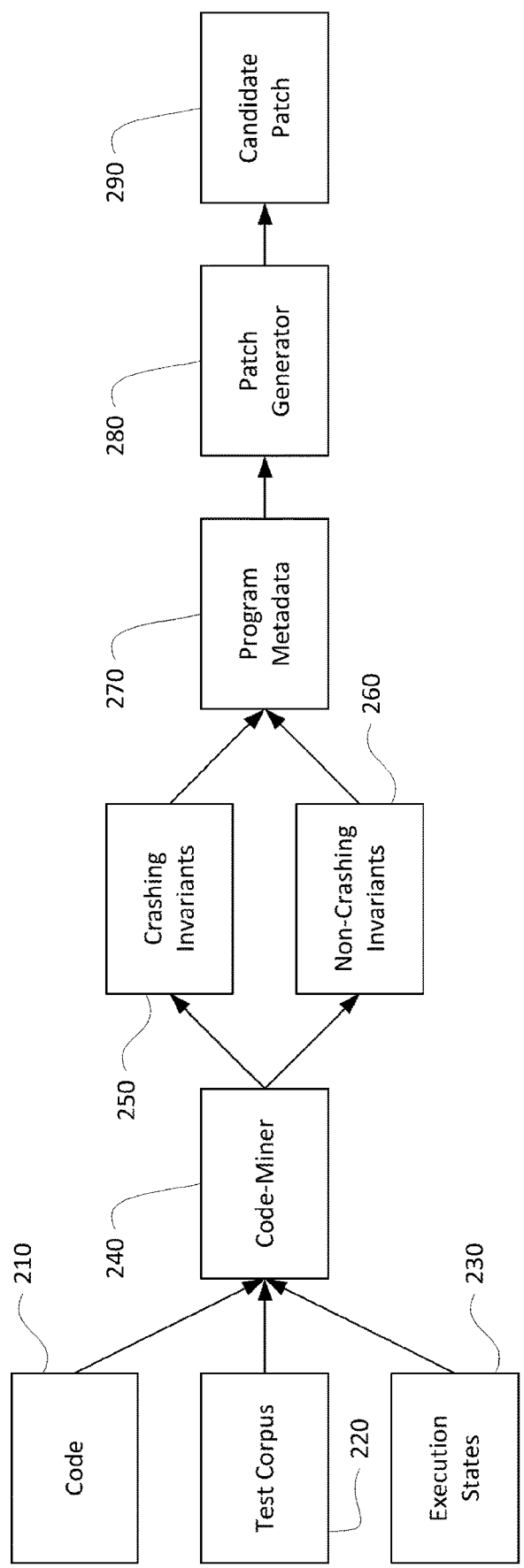
FIG. 2 is an example functional diagram in accordance with aspects of the disclosure.

In order to protect vulnerable code from attack, potential security violations may be detected by first generating inputs for the code. For instance, fuzzing techniques, such as LLVM LibFuzzer or others, may be used to generate random inputs or fuzzing targets for the code. At least some of these inputs may be violating inputs, or rather, those that may expose or result in a security violation. Similarly, at least some of these input may be non-violating inputs, or rather, those that do not necessarily expose or result in a security vulnerability. The generated inputs may also make up a "test corpus". FIG. 2 is an example functional diagram 200 that identifies aspects of candidate patch generation for a set of code 210. In this example, test corpus 220 of FIG. 2, may include the generated inputs discussed above.

The code may then be executed using each of the generated inputs. For each execution, execution states at various code locations may be monitored. For instance, the code locations may involve transforming or moving data in various steps. Over the course of the program execution through these code locations, memory allocations and deallocations may be tracked in metadata and updated. This metadata may include information such as size of applicable memory regions as well as some content information (such as potential null-termination of strings). At runtime, the metadata may be used to track for every pointer, which base pointer and thus which memory allocation, it is pointing to. Thus, for any memory access, the metadata may identify the size of the allocated memory region. As such, when executing the code, the metadata is essentially collection or print out of log of diagnostic information for every accessed memory region. For instance, this diagnostic information may include: identifying compiler infrastructure or LLVM debug information, such as program location, variable information, accessed memory byte address, starting address of the accessed memory region (or 0, if invalid access), ending address of the accessed memory region (or 0, if invalid access), next Null-terminating character of accessed memory byte (or −1, if not applicable), and other such information.

The states may indicate whether or not a security violation has occurred and also whether the execution is overall a "non-crashing execution" with no security violation or a "crashing execution" with a security violation. Examples of crashing executions may include heap buffer overflows, static memory overflows, use-after-frees, as well as other runtime issues leading to undefined behaviors. For each type of crashing execution, there may be a set of commonly occurring patterns of patches to consider. These patterns may be encoded as template patches for which a proper instantiation to the code being patched needs to be discovered.

The code, the generated inputs, and the execution states may be analyzed to determine conditions that likely caused the security violation associated with one or more of the inputs. For instance, a code-miner, such as code-miner 240 of FIG. 2, may be used to compare the generated inputs and the execution states of passing executions with those of the failing executions to identify conditions that distinguish the non-crashing executions from the crashing executions. FIG. 4A is an example of a sample code with a C string bug which would result in a crashing execution. In this example, the code-miner may be used to identify a plurality of conditions including: string length of result→content is the same as string length of content; String length of result→content is the same as result→length; string length of content is the same as result→length; allocation size of result→content is 1 more than string length of result→content; allocation size of result→content is 1 more than result→length; etc. Many of these relationships may not be useful to generating a patch, but at least some may be interesting such as the relationship between the allocation size of result→content and the value of result→length.

The code-miner may also generate patch conditions or invariants for these conditions. Returning to FIG. 2, the code-miner 240 may generate "crashing invariants" 250 and "non-crashing invariants" 260 which are then incorporated into the program metadata 270 as inputs to the patch generator 280. Invariants may be abstract representations of states of the program, for example, variable x=10. The crashing and non-crashing invariants generated by the code-miner may be dynamic invariants, as statically computing invariants may be too imprecise for features such as non-normalized loops or recursive functions. A dynamic invariant may be an abstract representation of a condition that apply to a set of executions of the code, while a static invariant may be computed statically over all paths of the program. The dynamic invariants may be expressed as predicate templates, discussed further below, such as some_variable=symbolic_buffer_length (relating to a symbolic buffer length discussed further in an example below), some_variable=some_other_variable (where some_other_variable will include the symbolic buffer lengths), some_variable+some_constant≤buffer_size, and so on. Dynamic invariants from across multiple executions may be joined to create more complex dynamic invariants and therefore more complex patches. These crashing invariants and non-crashing invariants may be incorporated into the program metadata that is input into the patch generator.

Dynamic invariants may be determined in various ways. For instance, dynamic invariants may be determined based on user input. In some instances, it is advantageous to employ one or more machine learning techniques to determine differences, correlations, and invariants between the non-crashing and crashing executions, such as Daikon, decision trees, classifiers, etc. For instance, the generated inputs and the metadata described above may be used to train a model. In some instances, as training inputs for a machine learning model, the generated inputs may be clustered based on whether they result in security violations at different code locations and/or failing executions. The generated inputs may be further clustered based on whether they reach a certain region of interest in the code.

The patch generator, such as patch generator 280 of FIG. 2, may then automatically generate a patch, such as candidate patch 290, from the program metadata 270. The candidate patch may include a patch condition and a patch location. The at least one candidate patch may cause the violating inputs associated with the security violation to fail execution and/or log the execution in order to allow operators to observe the issue in real-time and to further investigate using the log as discussed further below.

For instance, the patch generator 280 may generate a candidate patch by computing a difference between the crashing invariants and the non-crashing invariants. In other words, by analyzing the passing and failing executions, the differences in the values of the variables (i.e., the differences in the dynamic invariants) can be determined. This may allow the patch generator 280 generate a patch, for instance, if the size of the buffer is already being tracked within an existing variable which is in-scope at the point of the buffer-overflow.

The patches may be generated using the computed differences, at least some of which will correspond to pre-defined templates. For instance, based on the differences between the execution states for the passing and failing executions, and the type of crash being observed, a template may be identified. These templates may include various conditions that may resemble "some_variable<some_other_variable". In the foregoing examples, the all capitalized values represent "symbolic conditions" of a template for a patch that do not necessarily otherwise exist in the code. As one example, a template may be "BUFFER_INDEX<BUFFER_SIZE". This template may be identified when there is a buffer overflow, or where the code attempts to read a buffer at a location beyond the length of the buffer. As noted above, both BUFFER_INDEX and BUFFER_SIZE may be "symbolic conditions," that is, conditions that are not necessarily in the code that represent the buffer index and buffer size of a buffer used in the code. As another example, a template may be may be "ptr_arithmetic_expression<BASE_POINTER+BUFFER_SIZE". This template may be identified in the case of a buffer overflow caused by a pointer-arithmetic error. In this example, "ptr_arithmetic_expression" may correspond to a computation the code performs in order to index into memory, and both BASE_POINTER and BUFFER_SIZE may be "symbolic conditions" that are not necessarily in the code that represent the base pointer and buffer size of a buffer used in the code.

FIG. 5 is an example of a simple code. In the example of FIG. 5, a buffer overflow security violation occurs due to pointer arithmetic going out-of-bounds of the end of a buffer. The security violation occurs within DuplicateLastValue if the buffer pointed to by dest is the same size or smaller than the size parameter to the function the dest buffer will overflow. In this specific example, proper use of the function is in the function NonBuggyUser: the buffer str contains three elements, a new buffer duplicated is created to be of size four, and both 'str' and 'duplicated' are passed to DuplicateLastValue. The result is that 'dest' contains the the value of 'str' with the last item duplicated, i.e., duplicated=={'a', 'b', 'c', 'c'}. However, in BuggyUser the size of 'str' and 'duplicated' are the same. When these values are passed to DuplicateLastValue, the initial memcpy copies, without overflow, the contents of the source argument into 'dest', but the subsequent write to 'dest+size', i.e. dest+3 is out-of-bounds since 'dest' is of size three. In this case, the template ptr_arithmetic_expression<BASE_POINTER+BUFFER_SIZE may be identified, and here, 'ptr_arithmetic_expression' is 'dest+size'. The BASE_POINTER and BUFFER_SIZE are from either BuggyUser( ) or NonBuggyUser( ). In this example, the generated patch (after adjusting for weakest precondition discussed further below) may be placed in NonBuggyUser.

As another example, a template may be BUFFER_SIZE<STRLEN_SRC. This template may be identified when there is a string buffer overflow, where STRLEN_SRC refers to the length of a string being read from. Such security violations may occur when C string libraries expect string buffers to be null-terminated.

FIG. 6 is an example of a simple code. In this example, a buffer overflow occurs within the call to 'strcpy' in the BuggyStrCpy( ) function. The C-standard strcpy function copies from 'src' to 'dest' until a null-terminator is read in 'src'. In this case, the template BUFFER_SIZE>STRLEN_SRC may be identified. In this case, BUFFER_SIZE is the size of the buffer passed as the dest argument to 'strcpy', and STRLEN_SRC is the string-length length of the 'src' argument to 'strcpy'. Within the example, 5 would be substituted for BUFFER_SIZE and strlen(src) for STRLEN_src. Note that using the strlen function requires that src be null-terminated. This can be determined from the execution states of both passing and failing executions on the contents of 'src'. This type of template can be used to patch errors caused by a lack of null-terminator on a buffer.

Aliasing relationships may be captured dynamically using symbolic conditions capturing that a specific pointer must point to certain memory location(s). For example, this may be useful in determining that a pointer within the code points only to a buffer which is used in a crash. This is useful since pointer variables may point-to multiple memory locations, e.g., within a function with a pointer argument which is passed multiple distinct memory locations. In other examples, rather than using explicit templates, the patches may be generated using heuristics or other information. For instance, in the case of null pointer dereferences which occurs when a dereferenced pointer points-to a specific location (nullptr) which is always in scope. As such, if a dereference happens on ptr (pointer), the patch can include check ptr!=nullptr.

For instance, in the example of a numerical overflow, where int value=(int)result and int refers to an integer, a template may not be required since the patch generate may simply lookup the type. Thus, a patch for a numeric overflow may always be (for an int being overflowed) result >=std::numeric_limits<int>::lowest( )&&result<std::numeric_limits<int>::max( ).

FIG. 7 provides an example of a simple code where an error occurs down a particular branch within a function. In this example, the code reads uninitialized memory when 'c' is false. Since the general concept of reading uninitialized memory would not fit a template, in this example, the patch generator may fall back on mining differences between the passing and failing executions. In this case, the error only occurs when 'buffer' is read and 'c' is false. Again certain heuristics will likely be useful in these cases, e.g., restricting the variables used within the crash to be defined "close" to where the crash occurs (e.g., within the same function, within the same library/compilation-unit, within N-call-frames of the error stack trace). This may prevent spurious differences from being included in the patch, e.g., changes in global variables.

When the security violation is known or suspected to be a certain type and a template is identified, any of the "symbolic conditions" of the template for the security violation may first be set. For instance, in many cases the variables required for a patch do not actually exist in the program, for example, the size of the buffer is not actually being tracked explicitly. As such, these symbolic conditions allow insert variables into the program (the symbolic ones) in order to use these symbolic conditions to simplify the generation of the patch. As such, the symbolic conditions represent conditions or values that result in occurrence (or absence) of the security violation and can be used as the basis for defining the actual code that constitutes the candidate patch. In order to avoid blindly inserting variables and setting them with arbitrary values, in some instances, the patches may be generated by selecting template language or expressions that are then customized to trigger or avoid the security violation by causing (or preventing) the symbolic condition(s) from occurring or exiting execution if the symbolic conditions occur.

For instance, an identified template may include BUFFER_INDEX<BUFFER_SIZE. Thus using this template, a symbolic condition for buffer overflow may be set as 0≤BUFFER_INDEX<BUFFER_SIZE. For example, FIG. 3A provides an example code. In this example, 'idx' is BUFFER_INDEX. and 'length' is BUFFER_SIZE. Before executing buff[idx], the assertion: 0<=idx<length or in code: assert(0<=idx); assert(idx<length); may be added as a patch as shown in FIG. 3B.

However, it may not be straightforward which variable in the code contains BUFFER_INDEX or BUFFER_SIZE that was causing the security violation, in fact, the code itself may have no actual variable containing either BUFFER_INDEX or BUFFER_SIZE. Thus, the symbolic condition of 0≤BUFFER_INDEX<BUFFER_SIZE must be concretized by substituting in actual variables in the code or actual values during execution.

Returning to the example of FIG. 4A, non-crashing executions for the TrimTrailingCharacter function may all guarantee that str→length is bigger than 0 when the function is entered, whereas crashing executions at this line enter with str→length set to 0. Thus, a potential learned patch would be to add a crash before str→length is decremented to make sure it is not 0. Another interesting difference in the learned relationships would be at the point of the memory access. All non-crashing executions at that point guarantee that the string length of str→content is equal to the value of str→length. This is not true in the crashing executions. Thus, a patch may be generated by the patch generator for after the decrement operation, which checks this relationship.

The patch generator 280 may generate candidate patches for different conditions in various ways. For instance, two competing patches are shown in the example patched code of FIG. 4B (merged into a single example for simplicity though when in use, only a single patch is needed). By generating multiple patch conditions and different versions of the patched program, these can be compared them against one another. This may be useful to guard against bugs in the patch generation process which may otherwise cause bad patch proposals, for example.

The code, the generated inputs, and the execution states may also be analyzed by the patch generator to determine corresponding patch locations where the patch conditions are likely to occur. For instance, patches may be inserted immediately before the code locations where the security violations or undesired behaviors are observed.

FIG. 8A is an example of a simple code. In this example, the function RoundedAngle returns a value within [0, 360) or fails with an error code if the parameter angle is negative. This function may be assumed to be used in some code or application, where the value of the parameter angle can be provided in some way by a programmer After executing the code using the generated inputs, an input is discovered that causes undefined behavior when executing this code. In particular, a floating-point value that is larger than the maximally representable integer (or a not-a-number value, also known as NaN) is passed in as parameter angle. Running this code with a computer error detector such as UndefinedBehaviorSanitizer (UBSAN) may report a bad cast (an undesired behavior) at code location or the line marked as Float-to-int cast. In particular, this execution may identity that the undefined behavior occurs due to the fact that the value of the parameter angle was too large. To address this undefined behavior, a patch, such as the patch of the example patched code of FIG. 8B, may be generated. In this example, a program abort is introduced as a check before the code location where the bad cast occurred. The introduced check is very syntactic in such scenarios, and can easily be automated. Other typical cases may include handling of C strings, where a patch for a buffer overflow could be described as a missing null-terminating character or expected range checks. Checks could also contain regular expression matching for certain types of errors.

Each of the candidate patches may be inserted into the code at the locations of the candidate patches to create a set of candidate patched codes. Then, each of the candidate patched codes may be executed using generated inputs to obtain patched execution states. This may allow for the identification of changes between the execution states and patched execution states for the same generated inputs. The patch of FIG. 8B introduces a program abort at the point of failure. It checks that the upcoming cast from the floating-point variable angle is too large for the type int (std::numeric_limits<int>::max( ) returning the largest representable number of type int). If that conditions fails, the LOG_IF statement will log the error message "Auto generated path to avoid undefined behavior due to overflow." As such, the execution will abort due to the use of the FATAL logging level.

In this example, the candidate patch is especially beneficial in that it only patches the undesired behavior. Approaches that do not rely on actual executions may have also generated a check on underflow behavior. That is, such approaches would likely have tried to introduce a check that also makes sure that negative angles are too big in absolute terms. As the generated inputs did not result in, no such patch would be proposed. The reason the this would not occur, of course, is due to the fact that any negative angle value does not reach the cast due to the earlier check in the program.

Figure 9:
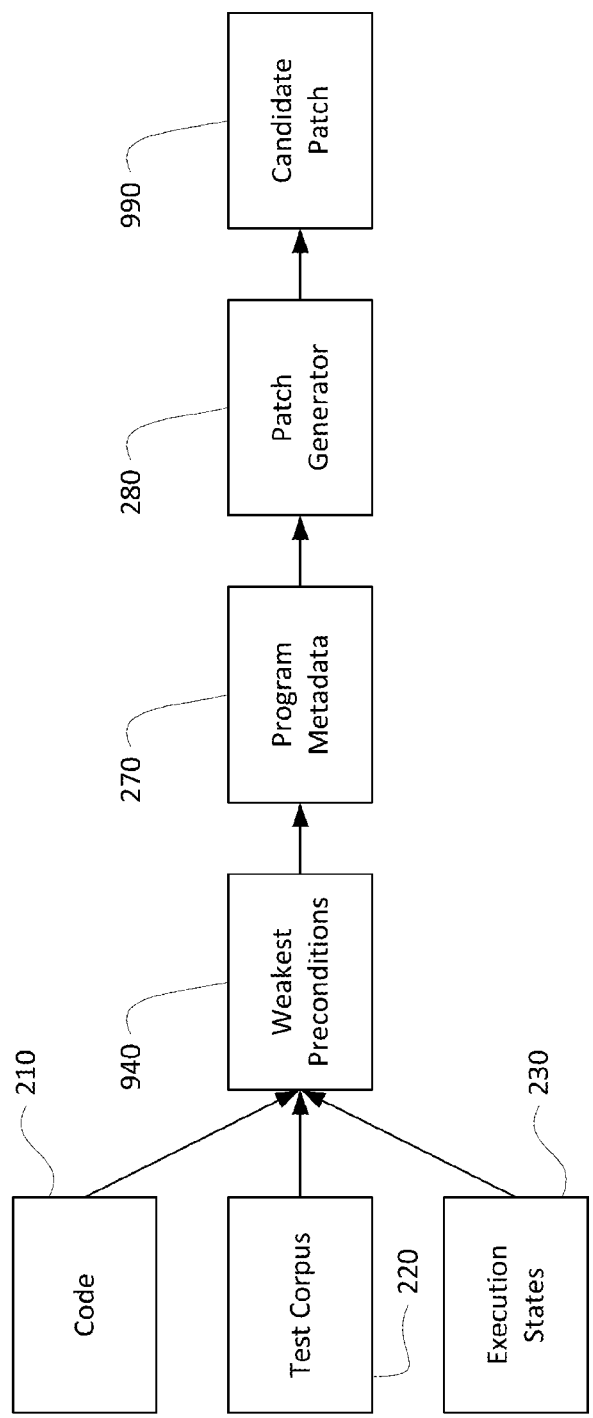
FIG. 9 is an example functional diagram in accordance with aspects of the disclosure.

In addition or alternatively, a candidate patch may be generated for a security violation by determining weakest preconditions based on the aforementioned templates as discussed above. FIG. 9 is an example functional diagram 900 that identifies aspects of candidate patch generation for a set of code 210 utilizing weakest preconditions 940. As shown, the weakest preconditions may also be incorporated into the program metadata 270 which is input into the patch generator 280 in order to generate a candidate patch 990.

A weakest precondition may be a formula that describes a set of program states or program inputs that exhibit a certain common behavior. As with invariants, weakest preconditions may also be computed statically or dynamically and at every execution stage of the code. A weakest precondition for a security violation at an execution stage may imply that if the weakest precondition is true, the execution will lead to the security violation assuming that all nondeterministic choices, such as thread schedules, are not altered in the re-execution.

FIG. 10 is an example of a simple program in order to further illustrate weakest condition. In this example, rand100( ) returns a random number between [0, 100). In this example, a crash, CRASH( ), is assumed to occur when x2 was 95, and y2 was 80. For the purposes of this example, the goal is to determine a condition on the return values of the calls to rand100( ) rather than at the location of an actual crash.

Rather than generating a candidate patch that only blocks this particular scenario (x2=95 and y2=80) or equivalently blocking (x=93 and y=8), it may be more useful to generalize these conditions. For instance, the condition x2>y2 can be expressed as x>10*y-2. This generalized condition may be the weakest precondition and represents many more cases, such as for example, any value for x if and only if y is 0. Since a crash was observed, there is at least one input that causes the crash to occur; the weakest precondition will never be empty. At a minimum, the weakest precondition would contain at least the single crashing input used to generate the weakest condition though this is unlikely to occur as generalization from a single crashing input will often cover a variety of different possible conditions.

Weakest preconditions can be computed along the whole execution trace or rather at every program execution stage in a crashing run. Such a weakest precondition at a execution stage may imply that if the condition is true, the execution will definitely run into the same exact crash again assuming that all nondeterministic choices, such as thread schedules, are not altered in the re-execution. That is, a weakest precondition of a crashing run at some program point can be used to effectively predict a security violation.

The weakest preconditions provide advantages in this context as the weakest preconditions can be computed locally to the crash-site (i.e. the location in the code at which an execution crashed). The closer to the crash-site the condition can be expressed, the more likely the weakest precondition is to be less complex and thus more readable. As an example, a user that develops a library XYZ which depends on features of another library ABC. In this example, library ABC also depends on library DEF. As library XYZ is being fuzzed, a security violation is observed in library DEF. In this situation, the security violation is now "two dependencies deep." The user is most likely interested in identifying security violations in library XYZ, as the user is developing that code. However, if the security violation occurs inside library DEF, it is unclear whether the security violation occurs in how XYZ uses ABC, how ABC uses DEF, or within DEF itself? As such, if the patch can be lifted up to within library XYZ, local to what is being fuzzed, this may be preferable.

Figure 11:
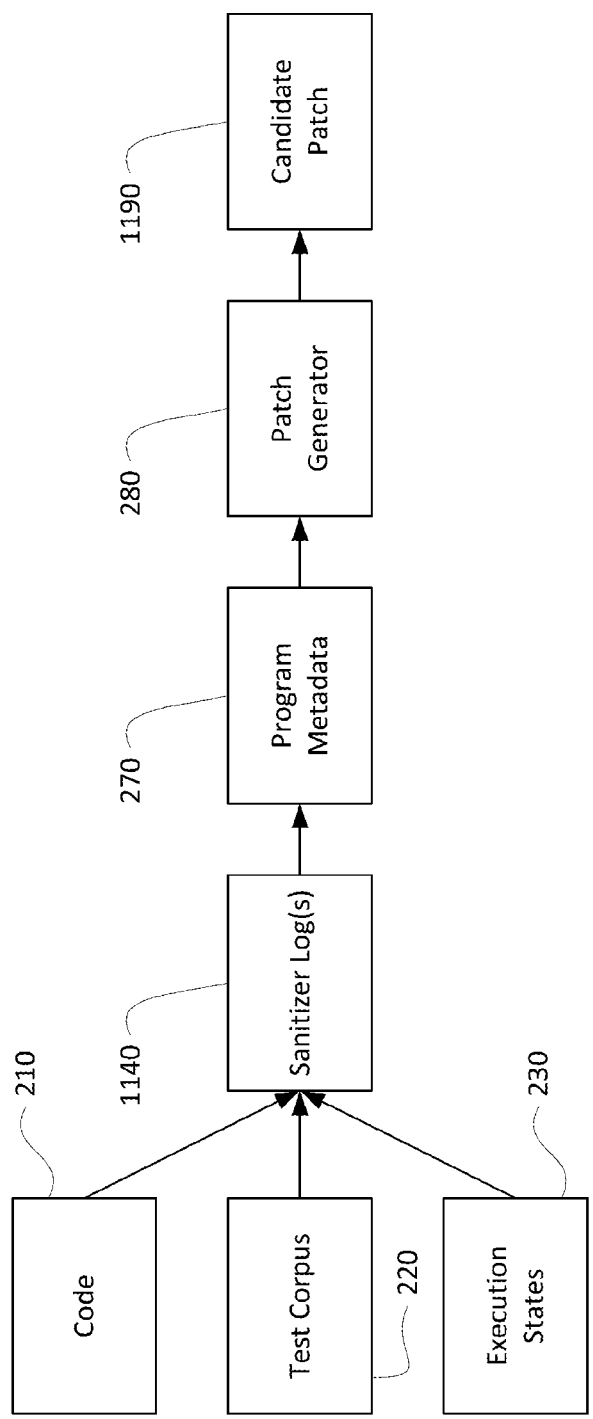
FIG. 11 is an example functional diagram in accordance with aspects of the disclosure.

In addition or alternatively, the patch generator may generate candidate patches based on tracking data flow through memory states collected by sanitizer logs. FIG. 11 is an example functional diagram 1100 that identifies aspects of candidate patch generation for a set of code 210 utilizing sanitizer logs 1140. As shown, the sanitizer logs may also be incorporated into the program metadata 270 which is input into the patch generator 280 in order to generate a candidate patch 1190.

Various instrumentations may be added to the code to permit tracking of memory allocation, deallocation, and accesses to generate sanitizer logs for memory-related security violations. For example, ASAN may be used to keep track of such memory data. Since ASAN is only used for patch generation and not during production, there may be very little or no impact on performance in production. Further, even during patch generation, selective memory tracking may be used. For instance, ASAN may be selectively turned on only for certain code locations or variables to minimize impact on performance. Other runtime monitoring techniques may also be used, such as Valgrind or other LLVM sanitizers.

Figure 12:
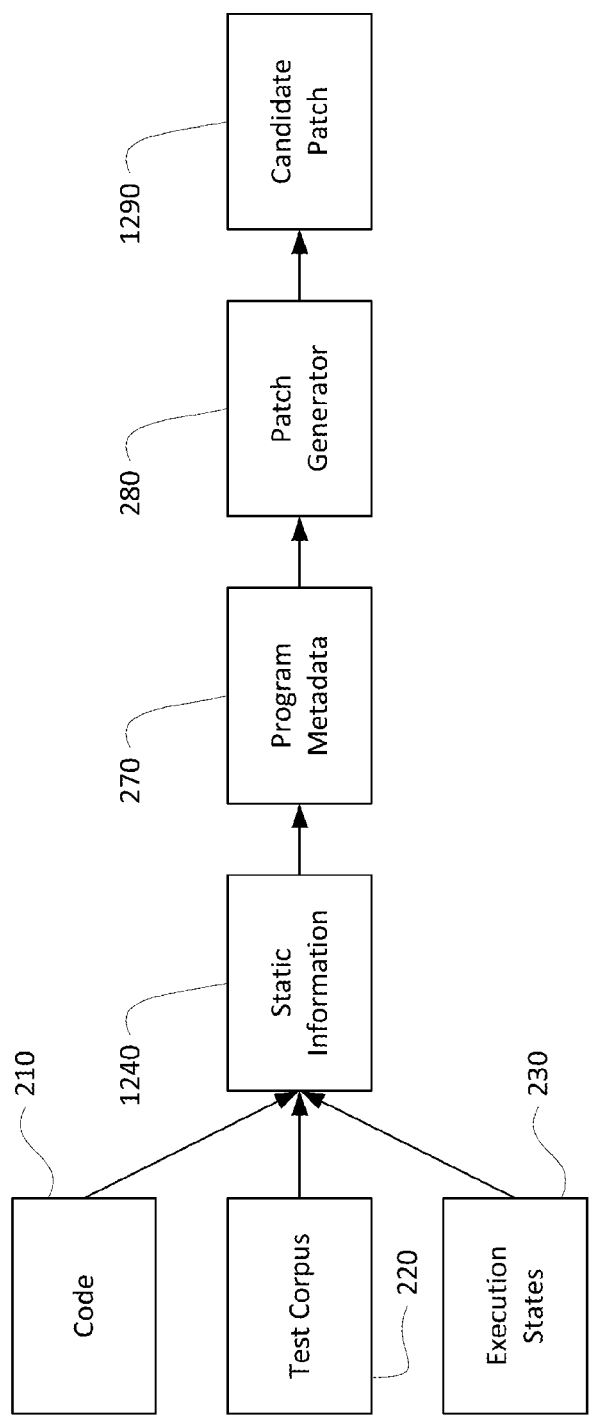
FIG. 12 is an example functional diagram in accordance with aspects of the disclosure.
Figure 13:
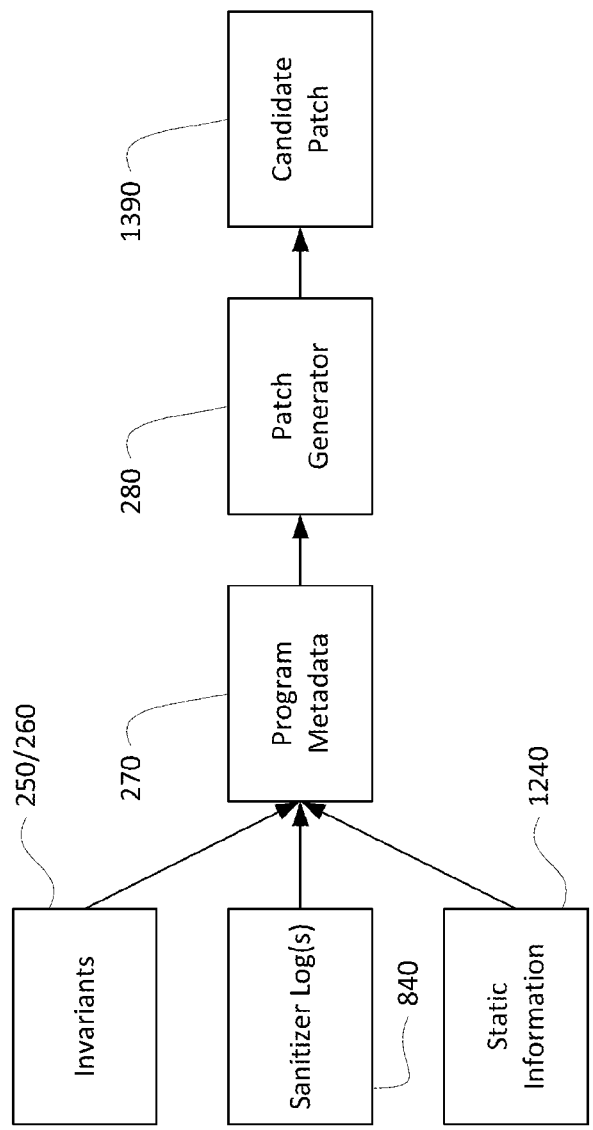
FIG. 13 is an example functional diagram in accordance with aspects of the disclosure.

In addition or alternatively, the patch generator may generate candidate patches based on static information. For instance, variable names and variable types may be used as additional information for generating the patch. For example, the concretization of symbolic conditions with variables in the code may be based on such static information. For another instance, some weakest preconditions may also be computed statically. For yet another instance, some invariants may also be computed statically. FIG. 12 is an example functional diagram 1200 that identifies aspects of candidate patch generation for a set of code 210 utilizing static information 1240. As shown, the static information may also be incorporated into the program metadata 270 which is input into the patch generator 280 in order to generate a candidate patch 1290. As noted above, the patch generator may thus generate candidate patches using the program metadata. FIG. 13 is an example functional diagram 1300 where the program metadata 270 includes a combination of crashing invariants 250, non-crashing invariants 260, sanitizer logs 1140, static information 1240 or any combination of these. Again, this program metadata is input into the patch generator 280 in order to generate a candidate patch 1390.

The patch generation process may be an iterative process. For example, after the code is patched using one of the candidate patches, a new set of violating and non-violating inputs may be generated for the patched code using new generated inputs. As with the example above, these generated inputs may be generated using fuzzing techniques. The patched code may be executed using the new generated inputs. Again, for each execution, states at various code locations are monitored. For example, the states may show that some of the new inputs cause a new security violation. The new security violation may be the same security violation as before the patch, a different security violation that is correlated to the security violation before the patch, or a different unrelated security violation. At this point, more data is available for analyses, or rather can be added to the program metadata 270, which include the code, the patched code, the generated inputs for the code, the generated inputs for the patched code, the execution states using the code, and the execution states using the patched code. The program metadata 270 may then be analyzed to determine new patch conditions that likely caused the new security violation as well the corresponding patch locations where the new patch conditions likely occurred. Based on these analyses, at least one new candidate patch may be generated for the new security violation.

Further, an iterative process may be used to determine incremental impact of the candidate patch. For example, non-violating inputs for the code before the patch should still be non-violating when used in an execution of the patched code. This way it is ensured that the patch does not cause an otherwise passing execution to fail. If non-violating inputs for the code before the patch are now somehow causing violations when used in an execution of the patched code, this means that the candidate patch had introduced an execution failure to the code and is therefore not a good candidate patch.

Figure 14:
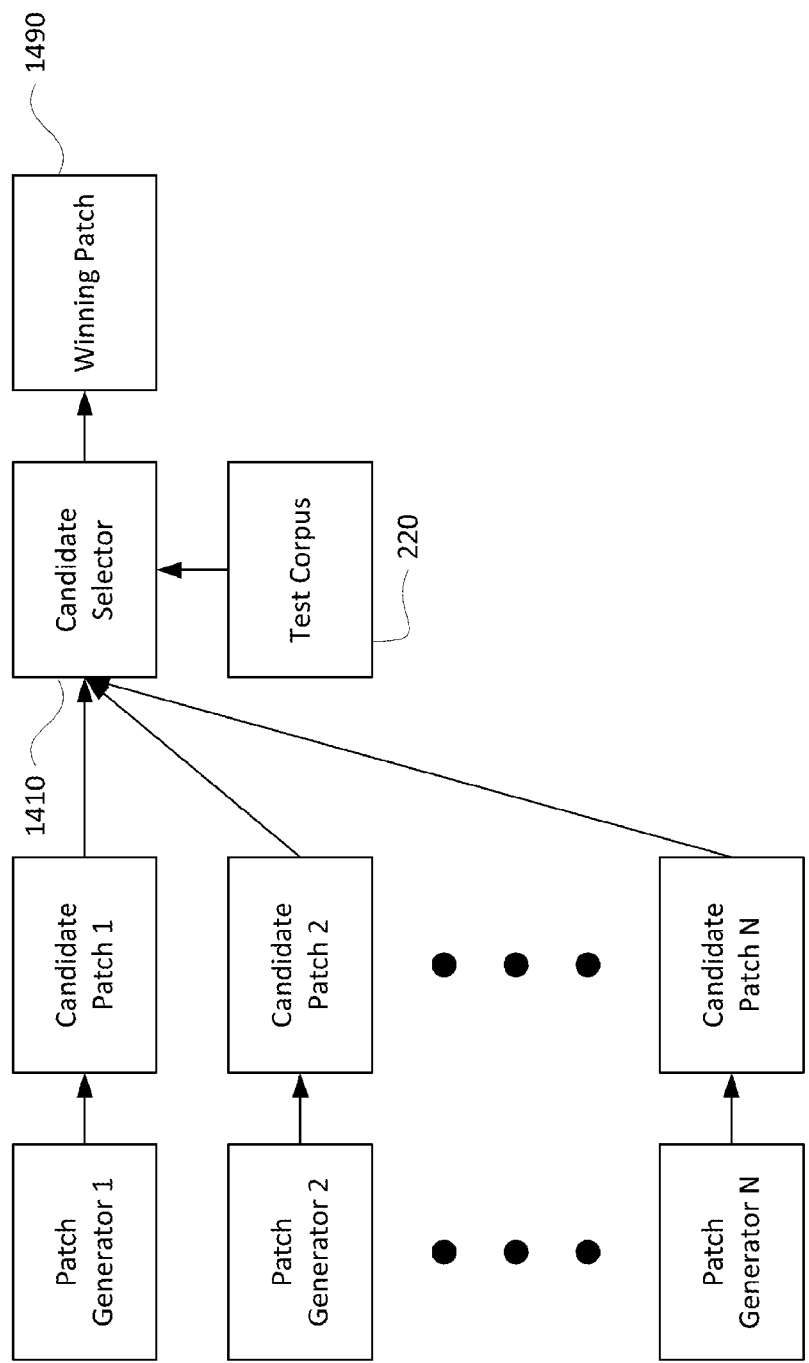
FIG. 14 is an example functional diagram in accordance with aspects of the disclosure.
Figure 15:
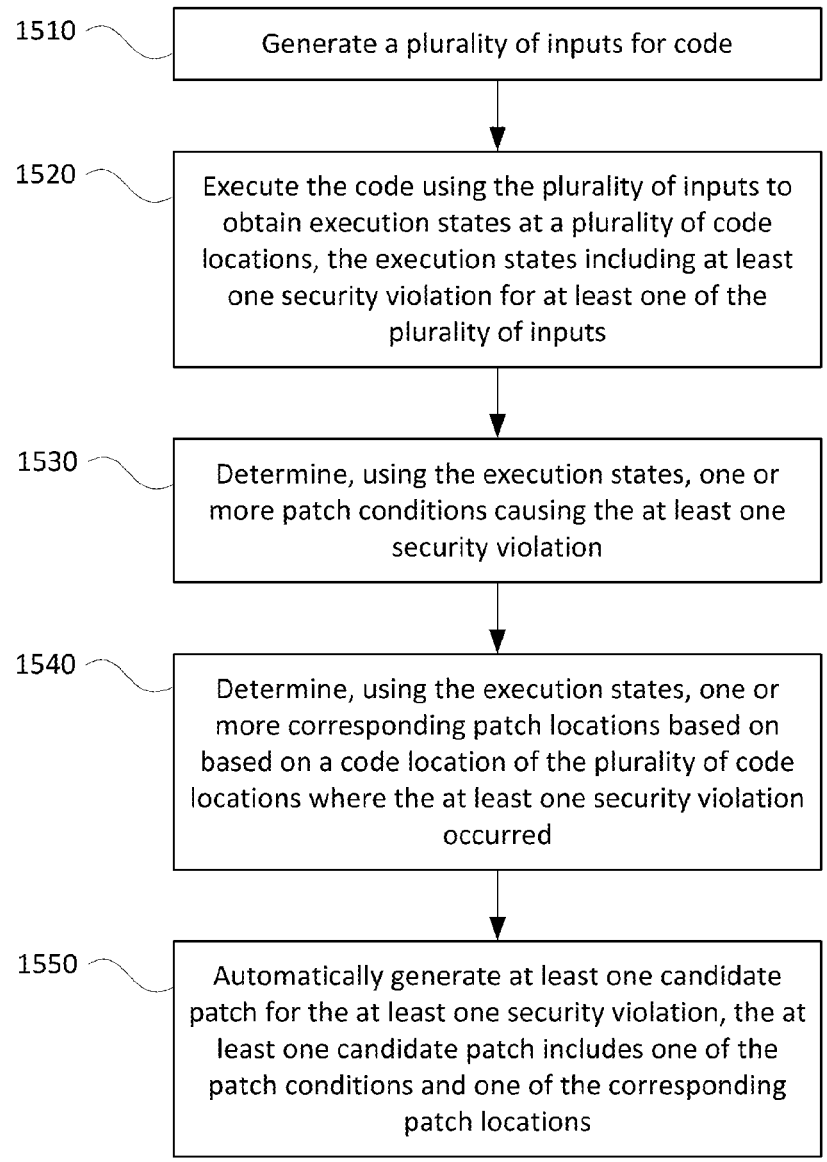
FIG. 15 is a flow chart illustrating an example method according to aspects of the disclosure.

In order to select a "best" or "winning" candidate patch for a given security violation, an iterative process may be used. The process may begin by generating a plurality of candidate patches using the same approach with different sets of inputs and/or using different approaches as described above. As shown in the example functional diagram 1400 of FIG. 14, "Patch Generator 1" may generate a first candidate patch using template-based weakest preconditions, "Patch Generator 2" may generate a second candidate patch using template-based dynamic invariants, "Patch Generator N" may generate the "$N^{th}$" candidate patch using the same code-miner, but with a different set of generated inputs, etc. In this example, each of the patch generators of FIG. 14 may correspond to the patch generator 280 in that it is an identical instance or the same instance Similarly, candidate patches 1, 2, and N may correspond to any of candidate patches 290, 990, 1190, 1290, or 1390.

The candidate patches as well as the test corpus 220 may be input into a candidate selector, such as candidate selector 1410, which selects or determines a winning patch from the candidate patches. A winning candidate patch 1490 may be determined based on the patched execution states, for example, a suitable candidate patch may be one that causes the violating inputs associated with the security violation to fail execution but still allows all of the non-violating inputs to pass execution. As an example, one candidate patch may slow down performance less than the other candidate patches and may therefore be a suitable candidate patch.

In addition or alternatively, a winning candidate patch may also be selected based on complexity of the candidate patch and/or the proximity of the candidate patch to site of the security violation. For instance, if a candidate patch has a very complex patch condition, operators may be reluctant to accept the candidate patch because it may be difficult to fully understand the effects of the candidate patch on the code. For another instance, although a security violation may occur due to a misuse of a very low-level library, a candidate patch having a patch location at such a low-level library may cause problems for many other codes sharing the same library, and therefore the candidate patch is not suitable and should not be a winning patch.

The winning patch may be inserted into the code at the location of the patch in order to cause the code to produce any number of desired results for inputs which would have previously resulted in a security violation. For instance, the winning patch may be a blocking patch that causes at least part of the code to abort execution before the security violation occurs. In addition or alternatively, the winning patch may be a diagnostic patch that causes data about the security violation to be collected or otherwise logged for immediate or later review. In addition or alternatively, winning patch may cause a display of information on the security violation to be generated. Such a display may appear, for instance, as visual and/or audible warnings on a computing device of an operator or user to prompt appropriate actions.

Such patches may also allow operators to observe the impact of the security violation in real-time and to decide whether to ignore the security violation, allow a blocking patch to be inserted, or to develop a full fix. For instance, instead of simply logging the security violation or displaying a notification in real time, a counter may be used to track how often a particular security violation has occurred. These counters for the different security violations may be viewed in real time, for instance, by providing a graphical user interface or other visual and/or audible representation of these numbers for review by an operator. This, in turn, may assist an operator in prioritizing security violations for review and/or fixing as well as to assist an operator in determining which security violations are or are likely to become emergent problems.

FIG. 12 is an example flow diagram 1200 for automatically generating patches for security violations in accordance with aspects of the disclosure. The blocks of the flow diagram may be performed by one or more processors, such as one or more processors 112. In this example, a plurality of inputs for a code is generated at block 1210. The code is executed using the plurality of inputs to obtain execution states at a plurality of code locations stages at block 1220. These execution states include at least one security violation for at least one of the plurality of inputs. At block 1230, using the execution states, one or more patch conditions causing the at least one security violation are determined. At block 1240, using the execution states, one or more corresponding patch locations where each of the one or more patch conditions occur are determined based on a code location of the plurality of code locations where the at least one security violation each of the one or more patch conditions occurred. At least one candidate patch for the security violation is automatically generated at block 1250. Each of the at least one candidate patch includes one of the patch conditions and one of the corresponding patch locations.

The methods and flow diagrams provided herein can be implemented as computer programs comprising computer-readable instructions causing a processor to carry out the methods and flow diagrams as described.

Again, the technology described herein is advantageous because it protects vulnerable code from attack via security violations even before a full fix is available. The technology provides automatic generation of patches for security violations without having to wait for a full fix by operators. These patches, while not fixing the program's logic entirely, may cause the code to abort before a security violation occurs, thereby hardening or protecting the code from exploitation. This has the advantage to bring the time to mitigate potential exploitation down from months to hours. In addition, in some implementations, it is advantageous to use heuristics and/or machine learning to select automatically generated patches that block security violations, but still allow passing execution with non-violating inputs. The technology further provides iterative processes to validate the generated patch, analyze the impact of the patch, and produce more suitable patches for selection. Further, the patches may have alternative or additional functions such as collecting data for better forensic analyses and displaying security violations to warn developers and users.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

STATEMENT OF INDUSTRIAL APPLICABILITY

The features described herein enjoy wide industrial applicability, for instance, in the fields of software security and development.

The invention claimed is:
1. A method of automatically generating patches for security violations, comprising:
  generating, by one or more processors, a plurality of inputs for code;

executing, by the one or more processors, the code using the plurality of inputs to obtain execution states at a plurality of code locations, the execution states including at least one security violation for at least one of the plurality of inputs;

identifying, by one or more processors, one or more code conditions causing the security violation;

determining, by the one or more processors using the execution states, one or more patch conditions for the one or more code conditions, the one or more patch conditions comprising at least one dynamic invariant related to the identified one or more code conditions, wherein the at least one dynamic invariant is determined using a machine learning model trained using the generated plurality of inputs for code, and wherein the at least one dynamic invariant comprises a condition that applies to executions of the code;

generating, by the one or more processors, program metadata based on the one or more patch conditions;

determining, by the one or more processors, using the execution states, one or more corresponding patch locations based on the one or more code conditions; and automatically generating, by the one or more processors, at least one candidate patch for the at least one security violation based on the program metadata, the at least one candidate patch includes one of the patch conditions and one of the one or more corresponding patch locations, wherein the at least one candidate patch is configured to cause at least part of the code to abort execution before a security violation can occur.

2. The method of claim 1, further comprising generating, by the one or more processors, patched code by inserting the at least one candidate patch into the code.

3. The method of claim 1, wherein the at least one candidate patch is configured to generate a log of diagnostic information for a security violation.

4. The method of claim 1, further comprising:
generating, by the one or more processors, a set of candidate patched codes by inserting each of the one or more candidate patches into the code;
executing, by the one or more processors, each of the candidate patched codes using the plurality of inputs to obtain patched execution states at the plurality of code locations;
selecting, by the one or more processors, a candidate patch among the one or more candidate patches based on the patched execution states; and
generating, by the one or more processors, second patched code by inserting the selected candidate patch into the code.

5. The method of claim 1, further comprising:
selecting, by the one or more processors, a candidate patch from the at least one candidate patches based on at least one of complexity, proximity to a site of the at least one security violation, or impact on execution of the code; and
generating, by the one or more processors, patched code by inserting the selected candidate patch into the code.

6. The method of claim 5, further comprising:
generating, by the one or more processors, a new plurality of inputs for the patched code;
executing, by the one or more processors, the patched code using the new plurality of inputs to obtain new execution states at the plurality of code locations, the new execution states including a new security violation;

computing, by the one or more processors using the new execution states, one or more new patch conditions causing the new security violation associated with one or more of the plurality of inputs;

determining, by the one or more processors, using the new execution states, one or more new corresponding patch locations where each of the one or more new patch conditions occur; and generating, by the one or more processors, at least one new candidate patch for the new security violation, each of the at least one new candidate patch includes one of the new patch conditions and one of the new corresponding patch locations, wherein the at least one new candidate patch is configured to cause the new violating inputs associated with the new security violation to fail execution.

7. The method of claim 1, wherein the generated plurality of inputs for the machine learning model are clustered based on whether the generated plurality of inputs result in security violations at different code locations or failing executions, and based on whether the input reaches a region of interest in the code.

8. The method of claim 1, wherein the dynamic invariant includes a predicate template.

9. The method of claim 1, further comprising joining two or more of the dynamic invariants in order to determine the one or more patch conditions.

10. The method of claim 1, wherein generating the one or more patch conditions further comprises determining a weakest precondition related to the at least one security violation.

11. The method of claim 1, further comprising generating the one or more patch conditions, comprising tracking data flow through memory states collected by logs.

12. The method of claim 11, wherein tracking data flow through memory states includes using selective memory tracking.

13. The method of claim 1, wherein the at least one candidate patch is configured to cause at least some of the plurality of inputs associated with the at least one security violation to fail execution.

14. A system for automatically generating patches for security violations, the system comprising one or more processors configured to:
generate a plurality of inputs for code;
execute the code using the plurality of inputs to obtain execution states at a plurality of code locations, the execution states including a security violation for at least one of the plurality of inputs;
identify one or more code conditions causing the security violation;
determine, using the execution states, one or more patch conditions for the identified one or more code conditions, comprising at least one dynamic invariant related to the identified one or more code conditions, wherein the at least one dynamic invariant is determined using a machine learning model trained using the generated plurality of inputs for code, and wherein the at least dynamic invariant is at least comprises a condition that applies to executions of the code;
generating, by the one or more processors, a program metadata based on the one or more patch conditions;
determine, using the execution states, one or more corresponding patch locations based on the identified one or more code conditions; and
automatically generate at least one candidate patch for at least one security violation based on the program metadata, the at least one candidate patch includes one of the patch conditions and one of the one or more corresponding patch locations, wherein the at least one candidate patch is configured to cause at least part of the code to abort execution before a security violation can occur.

15. The system of claim 14, wherein the one or more processors are further configured to generate patched code by inserting the at least one candidate patch into the code.

16. The system of claim 14, wherein the at least one candidate patch is configured to cause at least some of the plurality of inputs associated with the at least one security violation to fail execution.

17. The system of claim 14, wherein the at least one candidate patch is configured to generate a log of diagnostic information for a security violation.

* * * * *